US010116497B2

(12) United States Patent
Gerety et al.

(10) Patent No.: US 10,116,497 B2
(45) Date of Patent: Oct. 30, 2018

(54) SYSTEMS AND METHODS FOR PROVIDING SPLIT CONTROL OF MULTIPLE EXECUTION ENVIRONMENTS

(71) Applicant: Moneygram International, Inc., Minneapolis, MN (US)

(72) Inventors: Adam Gerety, Trophy Club, TX (US); Andrew Typrin, Celina, TX (US); Troy Frost, Plano, TX (US)

(73) Assignee: Moneygram International, Inc., Minneapolis, MN (US)

( * ) Notice: Subject to any disclaimer, the term of this patent is extended or adjusted under 35 U.S.C. 154(b) by 159 days.

(21) Appl. No.: 15/160,652

(22) Filed: May 20, 2016

(65) Prior Publication Data

US 2017/0339010 A1 Nov. 23, 2017

(51) Int. Cl.
*H04L 12/24* (2006.01)
*H04L 29/08* (2006.01)
*G06F 9/50* (2006.01)
*G06Q 20/10* (2012.01)
*G06Q 20/28* (2012.01)
*G06Q 20/34* (2012.01)

(52) U.S. Cl.
CPC ........ *H04L 41/0803* (2013.01); *G06F 9/5061* (2013.01); *G06Q 20/102* (2013.01); *G06Q 20/28* (2013.01); *G06Q 20/342* (2013.01); *H04L 67/02* (2013.01); *H04L 67/125* (2013.01)

(58) Field of Classification Search
CPC .... G06Q 20/342; G06Q 20/28; G06Q 20/102; H04L 41/0803; H04L 67/125; H04L 67/02
See application file for complete search history.

(56) References Cited

U.S. PATENT DOCUMENTS 6,892,151 B1 * 5/2005 Giorgetta ............ G06F 17/5022
702/64
2003/0061218 A1 3/2003 Iyer et al.
(Continued)

OTHER PUBLICATIONS

International Search Report and Written Opinion issued for PCT/US2017/027394, dated Oct. 9, 2017, 13 pages.

*Primary Examiner* — Uzma Alam
(74) *Attorney, Agent, or Firm* — Norton Rose Fulbright US LLP

(57) ABSTRACT

The present disclosure describes systems, methods, and computer-readable storage media implementing techniques for providing split control of an execution environment. According to aspects of the disclosure, a first entity may be configured to exert control over presentation related aspects (e.g., the look and feel) of services provided by a second entity, while the second entity may exert control over backend processing and execution of the services. To facilitate the different portions of the split control, one or more servers may be configured to provide a first execution layer, a second execution layer, and a second execution layer control panel. The first execution layer may perform operations for executing the provisioning of the service. The second execution layer may perform operations for presenting the computing/execution environment for providing the service, and the second execution environment control panel may provide the first entity to customize/modify presentation related aspects of the computing/execution environment.

20 Claims, 6 Drawing Sheets

(56) References Cited

U.S. PATENT DOCUMENTS

| | | |
|---|---|---|
| 2005/0246726 A1 | 11/2005 | Labrou et al. |
| 2006/0026453 A1 | 2/2006 | Frost et al. |
| 2006/0294141 A1 | 12/2006 | Tsang et al. |
| 2007/0233540 A1* | 10/2007 | Sirota .............. G06Q 10/06315 |
| | | 705/7.25 |
| 2008/0201367 A1* | 8/2008 | Kim .................. G06F 17/30873 |
| 2008/0235223 A1* | 9/2008 | Douglas ................. G06Q 10/10 |
| 2009/0164795 A1* | 6/2009 | Justus ................. H04L 63/0815 |
| | | 713/182 |
| 2011/0047484 A1* | 2/2011 | Mount ................... G06Q 10/10 |
| | | 715/753 |
| 2014/0304179 A1* | 10/2014 | Morley .................. G06Q 10/10 |
| | | 705/317 |
| 2015/0055640 A1 | 2/2015 | Wang et al. |
| 2016/0063416 A1* | 3/2016 | Sharma ............ G06Q 10/06313 |
| | | 705/7.23 |
| 2016/0189121 A1* | 6/2016 | Best ..................... G06Q 20/405 |
| | | 705/40 |
| 2016/0205177 A1* | 7/2016 | Bapst ...................... H04L 67/42 |
| | | 709/201 |
| 2016/0217274 A1* | 7/2016 | Byrne ..................... G06F 21/10 |
| 2017/0140389 A1* | 5/2017 | Easton ................. G06Q 30/018 |

\* cited by examiner

SYSTEMS AND METHODS FOR PROVIDING SPLIT CONTROL OF MULTIPLE EXECUTION ENVIRONMENTS

TECHNICAL FIELD

The present application generally relates to techniques for integrating systems of different entities, and more particularly to systems and methods for providing split control of multiple execution environments.

BACKGROUND

Entities (e.g., businesses or individuals) that want to offer new services often have to invest significant amounts of resources and time in order develop and test the infrastructure (e.g., servers, networks, security systems and protocols, etc.) necessary to deploy those services. The development and testing process increases the operating costs for the entities, and delay the deployment of the service. Also, the newly developed infrastructure (e.g., systems, networks, etc.) may also require integration with, or modification of existing infrastructure (e.g., existing networks, servers, point of sale (POS) terminals, etc.), further complicating and delaying the deployment of the service, and increasing the complexity of the day-to-day operations of the entity. This complicated process often prohibits or discourages many entities from investing the time and resources required to deploy new services, which in turn causes patrons of those entities to seek those services elsewhere, or causes reduced productivity for employees of those entities.

A further challenge faced by many entities when deploying new services is government regulations, which may place restrictions on how the services are implemented or provided, and often specify various requirements for auditing the provisioning of the services to users (e.g., for purposes of proving up compliance with the relevant regulations). In such instances, an entity desiring to deploy a new service that is regulated by the government must not only invest in the infrastructure necessary to provide the service, but may also have to invest in personnel that have expertise in understanding the relevant governmental regulations, such as for auditing and regulatory compliance purposes.

As an alternative to developing the systems and regulatory compliance infrastructure, an entity may seek to become a franchisee of another entity that already offers those same services. While this may reduce or eliminate one or more of the problems described above (e.g., because the franchisor may already have the necessary infrastructure developed, and may provide regulatory compliance assistance to its franchisees), this route often proves unsatisfactory to many entities. For example, as a franchisee, an entity is often limited with respect to control over how those services are provided. Additionally, the franchisees may have less creative freedom to customize the services they seek to provide to suit their users.

BRIEF SUMMARY

The present disclosure describes systems, methods, and computer-readable storage media implementing techniques and computer architectures for providing split control of an execution environment. According to aspects of the disclosure, a first entity may provide a service, and may exert control of the underlying functionality that providers the service, while a second entity may exert control over presentation related aspects (e.g., the look and feel) of the service. To facilitate the different portions of the split control, one or more servers may be configured to provide a first execution layer, a second execution layer, and a second execution layer control panel. The first execution layer may perform operations for executing the underlying functionality that provides of the service. The second execution layer may perform operations for exerting control over the presentation of a computing/execution environment for providing the service, and the second execution layer control panel may provide tools and processes that allow the second entity to customize/modify presentation related aspects of the computing/execution environment (e.g., the second execution layer control panel may exert control over a presentation layer of the second execution layer), thereby enabling the second entity to customize the computing environment utilized to provide the service.

In accordance with one aspect, a method for providing split control of an interactive computing environment that executes one or more services is disclosed. The method may include configuring at least one server to execute a first execution layer and a second execution layer. The first execution layer may correspond to a first service that is implemented by a first entity, and the second execution layer may include a presentation layer that governs the presentation of a computing environment while taking into account execution requirements of the first execution layer. The method may include providing a second execution layer control panel configured to provide control functionality to a second entity over one or more configuration aspects of the second execution layer. Additionally, the method may include providing said second entity with access to the at least one server in order to utilize the interactive computing environment to provide the service. The second entity may be able to provide the first service of the first entity to an end user while also controlling the second execution layer, including controlling the presentation of the computing environment which facilitates the first service.

In accordance with another aspect, a computer-readable storage media stores instructions that, when executed by one or more processors, cause the one or more processors to perform operations for providing split control of an execution environment is disclosed. The operations may include configuring at least one server to execute a first execution layer and a second execution layer. The first execution layer may correspond to a first service that is implemented by a first entity, and the second execution layer may include a presentation layer that governs the presentation of a computing environment while taking into account execution requirements of the first execution layer. The operations may also include providing a second execution layer control panel configured to provide control functionality to a second entity over one or more configuration aspects of the second execution layer. Additionally, the operations may also include providing the second entity with access to the at least one server in order to utilize the interactive computing environment to provide the service. The second entity may be able to provide the first service of the first entity to an end user while also controlling the second execution layer, including controlling the presentation of the computing environment which facilitates the first service.

In accordance with yet another aspect, a system configured to implement a computer architecture for providing split control of an execution environment is disclosed. The system may include at least one server configured execute a first execution layer, and a second execution layer. The first execution layer may correspond to a service that is implemented by a first entity, and the second execution layer may include a presentation layer that governs the presentation of a computing environment for providing the service while taking into account execution requirements of the first execution layer. Aspects of the system may further include configuring the at least one server to provide a second execution layer control panel that provides control functionality to a second entity over one or more configuration aspects of the second execution layer, such as aspects relating to controlling the look and feel of the computing environment to provide the service. Aspects of the system may further provide the second entity with access to the at least one server in order to utilize the interactive computing environment to provide the service.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
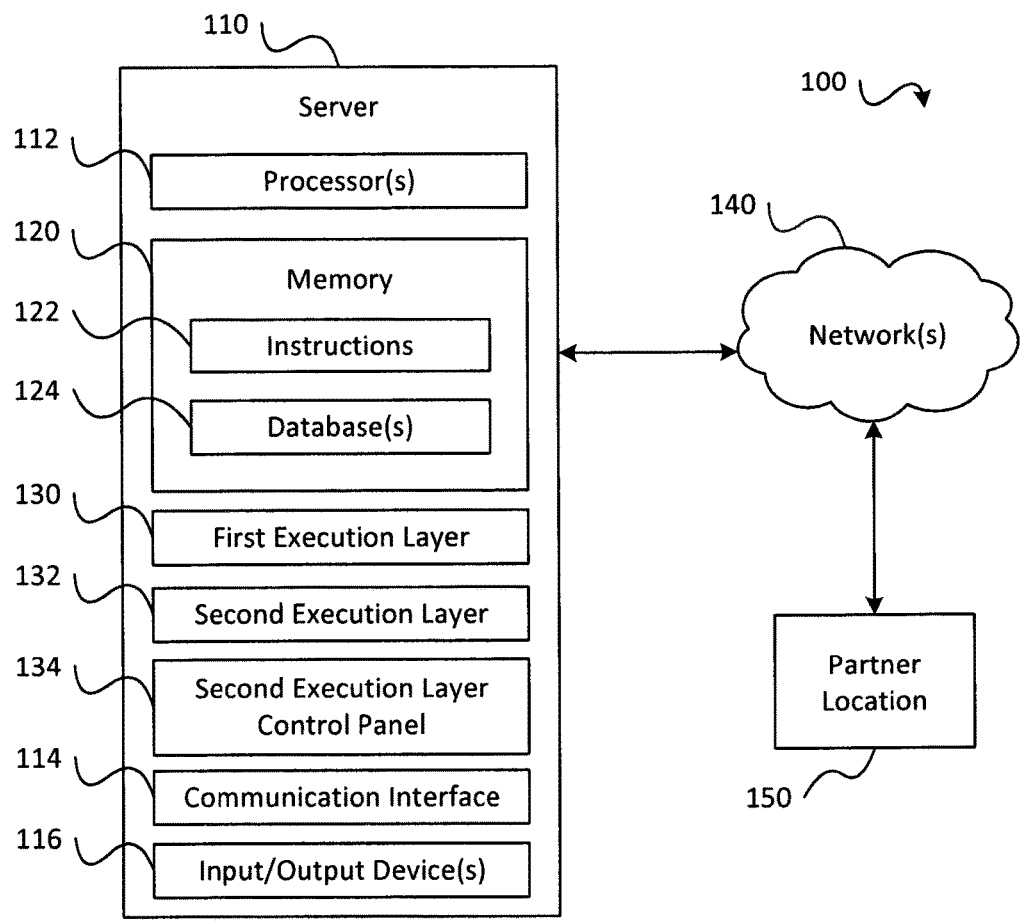
FIG. 1 is a block diagram illustrating aspects of a system for providing split control of an execution environment.

Referring to FIG. 1, a block diagram illustrating aspects of a system for providing split control of an execution environment is shown as a system 100. In an aspect, the computing/execution environment may be associated with a service provided by a first entity (e.g., a service provider). In an aspect, a second entity (e.g., a partner of the service provider) may exert control over presentation related aspects of the service, while the first entity may exert control over the underlying functionality that provides the service. As illustrated in FIG. 1, the system 100 includes a server 110, a network(s) 140, and a partner location 150. The network(s) 140 may communicatively couple the server 110 and one or more devices of the partner location 150, and may facilitate the providing of a service to one or more users associated with the second entity, as described in more detail below.

In an aspect, the network 140 may be a local area network (LAN), a wireless LAN (WLAN), a wide area network (WAN), a wireless WAN (WWAN), a public network (e.g., the Internet), a private network, a cellular data network, another type of network, or a combination thereof. The network 140 may operate according to one or more communication protocols, such as a transport control protocol/Internet protocol (TCP/IP), an Ethernet protocol, a cellular communication protocol (e.g., a $3^{rd}$ Generation (3G) wireless communication protocol, a $4^{th}$ Generation (4G)/long term evolution (LTE) wireless communication protocol, etc.), another wired or wireless communication protocol, or a combination thereof.

As shown in FIG. 1, the server 110 may include one or more processors 112, a communication interface 114, one or more input/output (I/O) devices 116, and a memory 120. The communication interface 114 may be configured to communicatively couple the server 110 to a network, such as the network(s) 140, using one or more communication protocols, such as one or more of the various communication protocols described above with respect to the network 140. The one or more I/O devices 116 may include a keyboard, a mouse, a barcode scanner, a scale, a touchscreen device, a radio frequency identification (RFID) device, a financial card reader, another type of I/O device, or a combination thereof. The memory 120 may store instructions 122 and a database 124. In an aspect, the instructions 122 may include instructions that, when executed by the one or more processors 112, cause the one or more processors 112 to perform operations for providing a service according to aspects of the present disclosure, as described in more detail below with reference to FIGS. 1-6. The database 124 may store various information associated with the operations of the server 110. For example, the database 124 may store information associated with one or more users (e.g., user profile information, password and user authentication information, user preference information, etc.), transaction log information (e.g., a log of various transactions, such as instances of providing the service to one or more end users), analytics information (e.g., information indicating historical trends for specific users or groups of users), inventory information, configuration information (e.g., computing environment configuration information, service information requirements, security protocol configuration information, encryption/decryption key information, and the like), audit log information, rules (e.g., rules relating to government regulations, rules for determining whether an instance of providing the service satisfies the applicable rules relating to government regulations, etc.), graphical user interface (GUI) configuration information (e.g., parameters specifying the locations and other presentation related aspects of a computing environment that has been customized by the second entity, etc.), other types of information, or a combination thereof. In an additional or alternative aspect, the database 124 may be stored at a memory that is external to the server 110, such as at a network attached storage (NAS) device accessible to the server 110 via the network(s) 140, at a database server (not shown in FIG. 1), or at an external storage device coupled to the server 110 (e.g., such as a universal serial bus (USB)

storage device). In still another additional or alternative aspect, the server 110 may be configured to provide or have access to two databases, with a first database configured to store information on behalf of the first entity in connection with providing the service, and a second database configured to store information on behalf of the second entity in connection with providing the service.

According to aspects of the present disclosure, the server 110 may be configured to provide the service to end users of the second party. For example, as shown in FIG. 1, the server 110 may be configured to execute a first execution layer 130, a second execution layer 132, and a second execution layer control panel 134. The first execution layer 130 may correspond to the service that is implemented by the first entity. For example, the first execution layer 130 may correspond to a service offered by a service provider. In an aspect, the first execution layer 130 may specify one or more security procedures and/or protocols to be used during the providing of the service. In an aspect, the security procedures and/or protocols executed by the first execution layer 130 may be configured to satisfy one or more government or industry specific regulations. In an aspect, the first entity may exert control over the security procedures and/or protocols executed by the first execution layer 130.

The second execution layer 132 may include a presentation layer that governs the presentation of a computing environment, such as the exemplary computing environment described and illustrated below with reference to FIG. 2, while taking into account execution requirements of the first execution layer 130. Further, the server 110 may be configured to provide the second execution layer control panel 134 that enables the second entity, such as a partner of the first entity, to exert control over functionality that governs one or more configuration aspects of the second execution layer 132.

The interactive computing environment provided by the server 110 may enable the second entity to provide the service of the first entity to end users, such as a customer or employee of the first entity, while also allowing the first entity to control the second execution layer 132, which, as described in more detail below, includes controlling the presentation of the interactive computing environment which facilitates the providing of the service to the end users. In an aspect, the instructions 122 may include instructions that, when executed by the one or more processors 112, cause the one or more processors 112 to perform operations for implementing the first execution layer 130, the second execution layer 132, the second execution layer control panel 134, or a combination thereof.

During operation, presentation of a computing environment configured to provide one or more services may be initiated. According to aspects of the present disclosure, the first execution layer 130 and the second execution layer 132 may provide for split control over the computing environment. For example, the first execution layer 130 may exert control over the computing environment with respect to execution of the underlying functionality for providing the service to a user, and the second execution layer 132 may exert control over presentation related aspects (e.g., the look and feel) of the computing environment.

Figure 2:
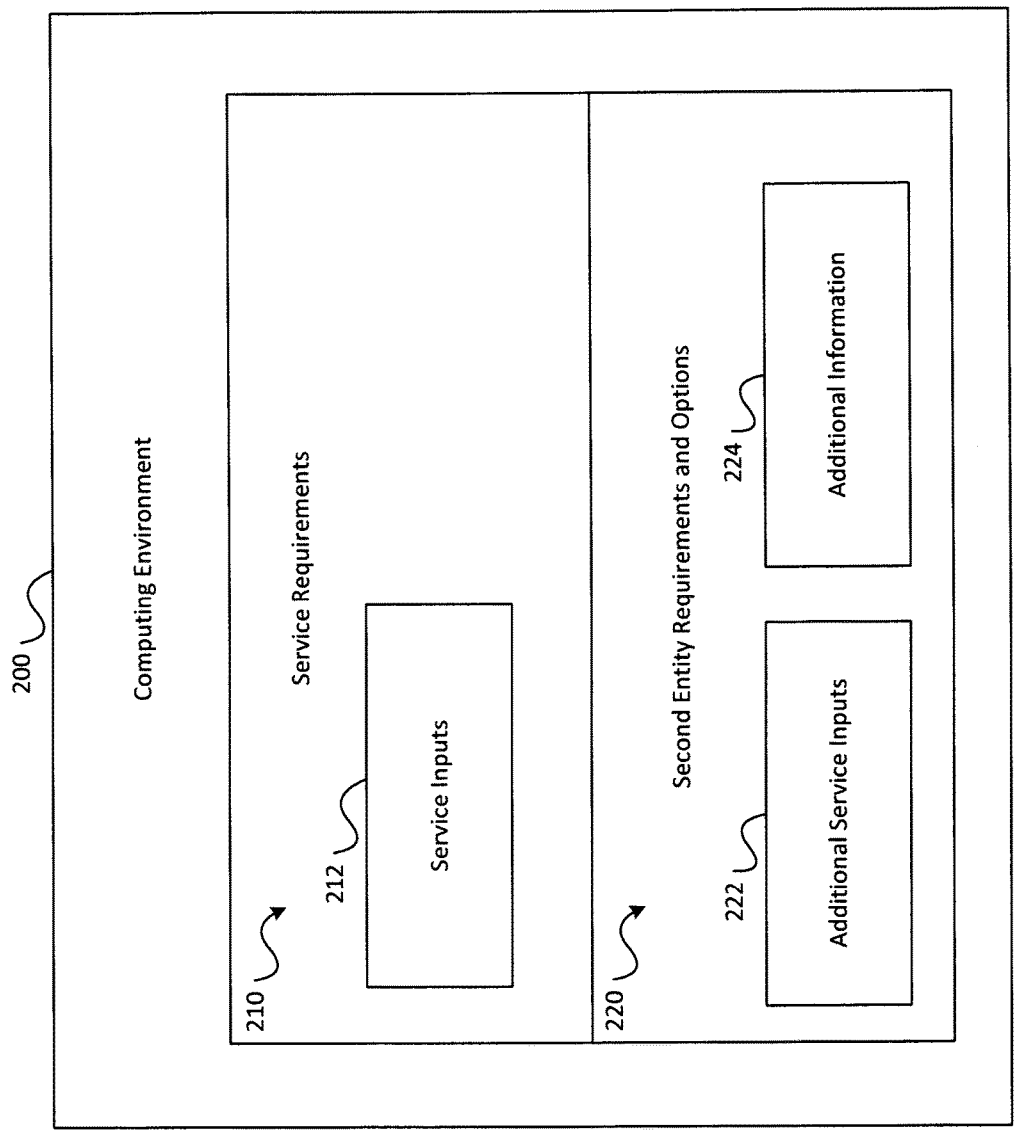
FIG. 2 is a block diagram illustrating a split control computing environment according to aspects of the present disclosure.

Referring briefly to FIG. 2, a block diagram illustrating a split control computing environment according to aspects of the present disclosure is shown as a computing environment 200. In an aspect, the computing environment 200 may be provided as a web page. In an additional or alternative aspect, the computing environment 200 may be a standalone application (e.g., an application executing on a workstation or other electronic device located at the partner location 150 of FIG. 1). As shown in FIG. 2, the computing environment 200 may provide a graphical user interface (GUI) configured to capture information from, and/or present information to, a user. The computing environment 200 may include a service requirements area 210 and a second entity requirements and options area 220. The service requirements area 210 may include one or more interactive elements for providing service inputs 212 to the computing environment 200 during the providing of the service. In an aspect, the service inputs 212 may correspond to inputs configured to capture information required by the second entity (e.g., the service provider) in order to provide the service. The second entity requirements and options area 220 may include one or more interactive elements for providing additional service inputs 222. In an aspect, the additional service inputs 222 may correspond to a set of additional inputs that may be used to customize information captured in connection with providing the service, such as to capture information that is beneficial to the second entity (e.g., the partner), but which is not required by the first entity to provide the service. For example, in an aspect, the service inputs 212 may specify a minimum set of inputs or data points (e.g., execution requirements) for capturing information needed to provide the service (e.g., to maintain compliance with any applicable government or industry specific regulations), and the additional service inputs 222 may specify one or more additional inputs or data points that capture information that may be useful to the second entity when providing the service. This may allow the second entity to apply a certain level of customization to the service, while allowing the first entity to maintain and exert control over the underlying functionality for providing the service, which may include regulatory compliance and/or other internal or industry-based purposes. In an aspect, the second entity requirements and options area 220 may be further configured to communicate information to the user. For example, in an aspect, the second entity requirements and options area 220 may present additional information 224 (e.g., information about other services and/or products offered by the second entity, promotional information, news information, and the like) that may or may not be unrelated to the service.

The second execution layer 132 may control the presentation of the computing environment 200 while taking into account execution requirements of the first execution layer 130, and the first execution layer 130 may control the provisioning of the service offered to the user via the computing environment 200. In an aspect, the execution requirements of the first execution layer 130 may include the service inputs 212, and control over the provisioning of the service by the first execution layer 130 may include specifying what inputs are included in the service inputs 212. In an aspect, only the second entity (e.g., the service provider) may have the ability to alter or modify the service inputs 212 and the first execution layer 130, thereby granting sole authority over the underlying functionality and execution requirements for providing the service. In an aspect, control over the presentation of the computing environment 200, as provided by the second execution layer 132, may include controlling aspects associated with the look and feel of the computing environment 200, such as the layout of the service requirements area 210 and second entity requirements and options area 220, the font, font color, font size, input mechanisms (e.g., text box, dropdown list, lookup table, etc.), what content or information is presented as the additional information 224, what inputs are provided in the additional service inputs 222, and the like. It is noted that the boxes representing the service requirements area 210 and second entity requirements and option area 220 are provided for purposes of illustration, rather than by way of limitation, and that interactive elements for capturing the information associated with service requirements area 210 and information associated with the second entity requirements and option area 220, may be presented in any arrangement, as may be configured by the second entity using the second execution layer control panel 134 of FIG. 1. Further, it is noted that while the second entity may use the second execution layer control panel 134 to add interactive elements to, or remove interactive elements from, the interactive elements associated with the second entity requirements and options 220, the second entity may not remove interactive elements associated with the service requirements area 210, and may only modify the arrangement, placement, color, font, etc. of those interactive elements. This configuration allows the second entity to control the look and feel of the computing environment 200, while guaranteeing that the execution requirements (e.g., the information necessary to provide the service in compliance with any applicable regulations) specified by the first entity are satisfied during providing of the service.

As briefly described above, in an aspect, the second execution layer control panel 134 may include and/or provide functionality that allows the second entity to configure aspects of the second execution layer 132, such as, for example, the look and feel of the computing environment 200. When the computing environment 200 is presented as a web page, for example, the second execution layer control panel 134 may provide the second entity with web-based access to the server 110, and may enable the second entity to configure the layout of the computing environment 200, which may include configuring the arrangement and layout of the interactive elements corresponding to the service inputs 212, the additional service inputs 222, and the additional information 224. It is noted that although the second execution layer control panel 134 enables the second entity to configure the layout and look of the service inputs 212, the second execution layer control panel 134 does not permit removal or other modifications to the service inputs 212. For example, if the service inputs 212 require input of a user's full name to include the user's FIRST NAME, MIDDLE NAME, and LAST NAME, the second execution layer control panel 134 would not permit the partner to configure the computing environment 200 to only request the user's FIRST NAME, MIDDLE INITIAL, and LAST NAME. However, the second execution layer control panel 134 would permit the partner to configure the additional service inputs 222 to capture additional information (e.g., information that is in addition to the information captured by the service inputs 212). For example, if the service inputs 212 only required the user to provide their FIRST NAME and LAST NAME, the second execution layer control panel 134 could be used to configure the computing environment 200 to capture the user's FIRST NAME and LAST NAME as part of the service inputs 212, and to configure the computing environment 200 to capture the user's MIDDLE NAME or MIDDLE INITIAL as part of the additional service inputs 222. Other examples of information that could be required as part of the service inputs 212 or additional service inputs 222 may include: the user's home address, business address, or both; the user's home telephone number, work telephone number, cellular telephone number, or a combination thereof; the user's citizenship information; the user's employment information or history; personal references of the user; a picture of the user; the user's biometric information; financial card information; financial account information; social security number information; other types of information; or a combination of these types of information.

During the process of configuring the look and feel of the computing environment 200 using the second execution layer control panel 134, information may be generated and stored at the database 124 (e.g., as the GUI configuration information). In an aspect, the generated information may include extensible markup language (XML) data, hypertext markup language (HTML) data, or other information that may be used to configure and present the computing environment 200. When the service is requested (e.g., in response to a request to present the computing environment 200) by a user, the second execution layer 132 may access the GUI configuration information stored at the database 124 to configure and present the computing environment 200 according to the look and feel specified by the second entity. As indicated above, because the service inputs 212 cannot be removed, the second execution layer 132 includes and/or provides a presentation layer that governs the presentation of the computing environment 200 while taking into account one or more required information fields of the first execution layer 130. Once the service inputs 212, and any required additional service inputs 222 have been provided to the computing environment 200, the first execution layer 130 may execute a validation routine that verifies that all required information (e.g., at least the service inputs 212) is present and input correctly, and, if the validation routine is completed successfully, the first execution layer 130 may execute additional operations to provide the underlying functionality that implements the service for the requesting user.

In an aspect, in addition to providing a presentation layer that governs the presentation of the computing environment 200, the second execution layer 132 may further implement a second service provided by the second entity. For example, the second entity may provide one or more existing services to its users. In an aspect, these existing services may correspond to primary services provided by the second entity, and the service provided by the first execution layer 130 may correspond to a secondary service that the second entity desires to provide to its users. Instead of developing and testing the infrastructure necessary to provide the secondary service, the second entity may coordinate with the first entity to provide the service using the architecture illustrated in FIG. 1, which may minimize the costs for deploying the secondary service, and reduce or eliminate delays in introducing the service to the second entity's users. In an additional or alternative aspect, the service provided by the first execution layer 130 may be the primary service provided by the second entity, and the second service or services provided by the second execution layer 132 may be secondary services that are complimentary to the primary service.

In an aspect, the server 110 may be hosted by the first entity. This arrangement may simplify the process of enabling the second entity to deploy the service, since the systems of the second entity, such as workstations, or other systems at the partner location 150 may access the service via a communication interface (e.g., a communication interface similar to the communication interface 114 described above). In an additional or alternative aspect, the server 110 may be hosted by the second entity, and may communicate with one or more systems of the first entity (not shown in FIG. 1) via the network 140 during the provisioning of the service. This arrangement may also simplify the process of deploying the service because the second has already created the underlying functionality necessary to provide the service, and may readily deploy that functionality as the first execution layer 130. Thus, the server 110 only needs to be configured to include the first execution layer 130, and to provide the second execution layer 132, and the second execution layer control panel 134, which perform presentation and formatting operations with respect to the service provided by the first execution layer 130. In still another additional or alternative aspect, the server 110 may be hosted by both the second entity and the first entity. In this arrangement, the deployment of the service may be provided by deploying the server 110 on a network, such as the network(s) 140, that is accessible to existing systems of both the first entity and the second entity. Additional aspects for providing split control of an execution environment according to the present disclosure are described below with reference to FIGS. 3-6.

Figure 3:
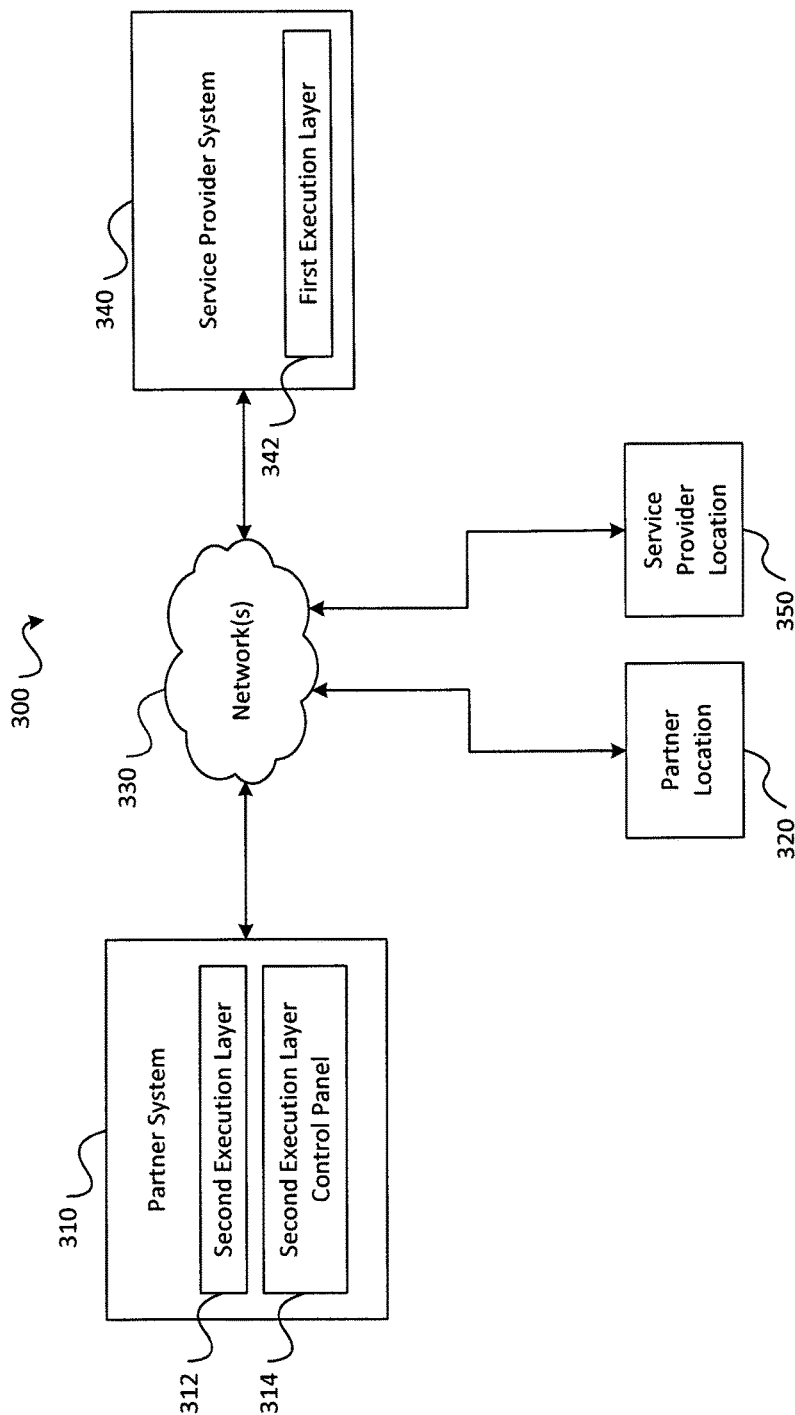
FIG. 3 is a block diagram illustrating additional aspects of a system for providing split control of an execution environment.

Referring to FIG. 3, a block diagram illustrating additional aspects of a system for providing split control of an execution environment is shown as a system 300. As shown in FIG. 3, the system 300 includes a partner system 310, a partner location 320, a network(s) 330, a service provider system 340, and a service provider location 350. In an aspect, the network(s) 330 may be the network 140 of FIG. 1. Additionally, in an aspect, the partner system 310 and the service provider system 340 may include one or more components similar to the components of the server 110 described above with respect to FIG. 1. For example, the partner system 310 and the service provider system 340 may each include one or more processors, one or more memory devices storing instructions and/or database information, network communication interfaces, I/O devices, and the like. However, the system 300 differs from the system 100 of FIG. 1 with respect to the deployment of the execution layers and second execution layer control panel. For example, in the system 300, the partner system 310 includes a second execution layer 312 and a second execution layer control panel 314, while the service provider system 340 includes a first execution layer 342. In an aspect, the first execution layer 342 may be the first execution layer 130 of FIG. 1, the second execution layer 312 may be the second execution layer 132 of FIG. 1, and the second execution layer control panel 314 may be the second execution layer 134 of FIG. 1. Such an arrangement may provide better control and/or security in some aspects. For example, configuring the partner system 310 to only provide the second execution layer 312 and the second execution layer control panel 314, which relate to the presentation of the service and/or one or more additional services provided by the partner may reduce or eliminate potential risk that a fraudster can exploit the operations of the first execution layer and corresponding service. Further, such a configuration maintains a separation between the system that presents the computing environment that provides access to the service, and the system that provides the underlying functionality required to provide the service. This may reduce the likelihood that a compromise of one of the entities exposes the other entity to risk. For example, if the partner system 310 is compromised, the service provider system 340 may prohibit the second execution layer 312 and/or second execution layer control panel 314 from accessing the first execution layer 342, or vice-versa.

In an additional aspect, services provided by the system 300 may enable at least a portion of the service to be provided via a service provider location 350. For example, if the service is associated with movie rentals, the service provider location 350 may correspond to a device or location where digital video discs (DVDs) may be picked up or dropped off in connection with the movie rentals. Thus, the user may utilize a partner system 310 located at partner location 320 to rent a movie (which may include receiving the DVD, or receiving a code that may be utilized at the service provider location 350 to receive the DVD), and then may return the movie to the service provider location, such as a movie rental kiosk, or, if the partner location also provides DVDs, the move may be returned at the partner location 320. The ability to utilize both partner locations and service provider locations to provide at least a portion of the service may expand the coverage area where the service may be provided.

Figure 4:
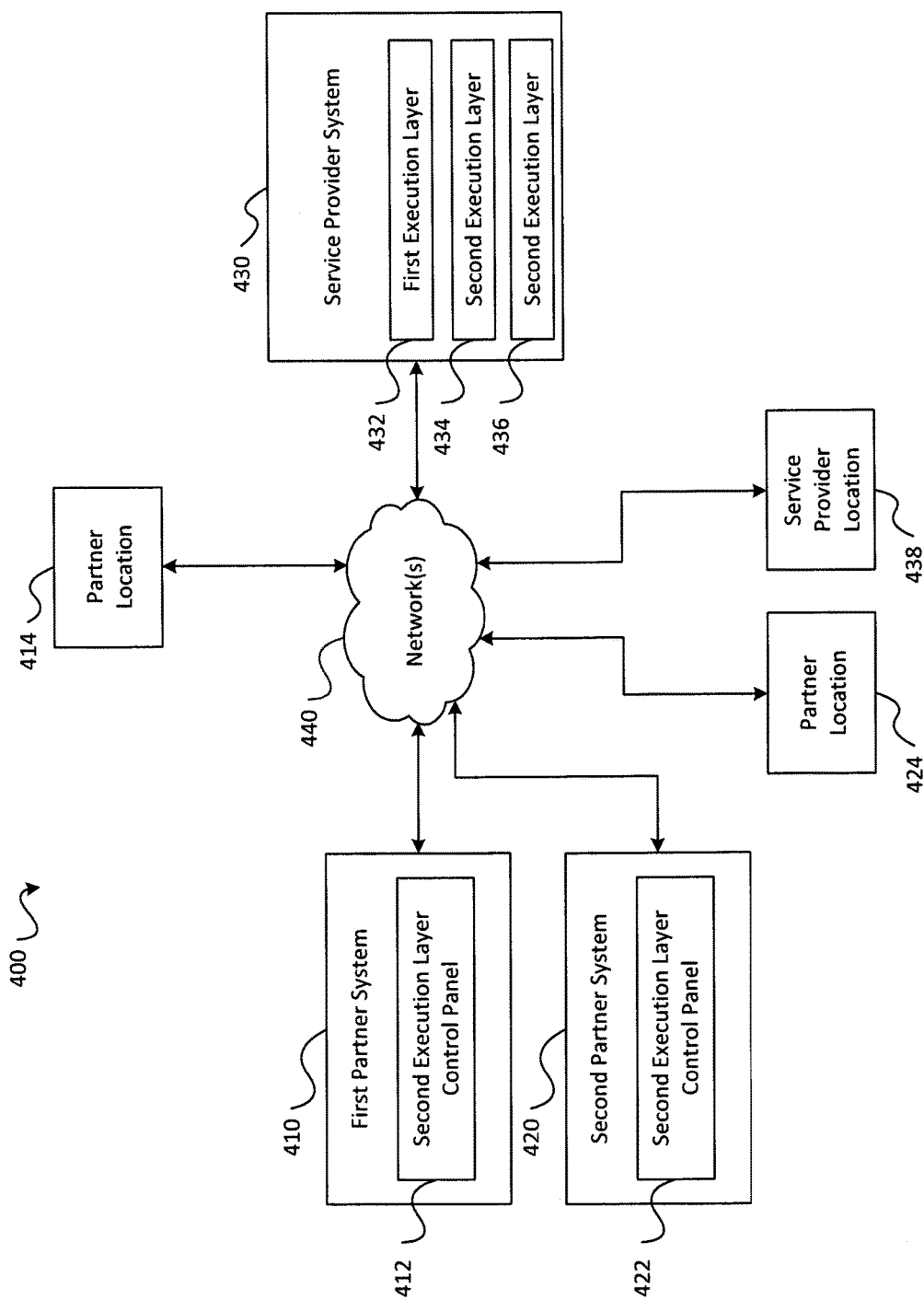
FIG. 4 is a block diagram illustrating additional aspects of a system for providing split control of an execution environment.

Referring to FIG. 4, a block diagram illustrating additional aspects of a system for providing split control of an execution environment is shown as a system 400. As shown in FIG. 4, the system 400 includes a first partner system 410, a first partner location 414, a second partner system 420, a second partner location 424, a service provider system 430, a service provider location 438, and a network(s) 440. In an aspect, the network(s) 440 may be the network 140 of FIG. 1. In an aspect, the partner systems 410, 420 and the service provider system 430 may include one or more components similar to the components of the server 110 described above with respect to FIG. 1. For example, these systems may each include one or more processors, one or more memory devices storing instructions and/or database information, network communication interfaces, I/O devices, and the like. However, the system 400 differs from the system 300 of FIG. 3 and the system 100 of FIG. 1 with respect to the execution layers. For example, in the system 400, the first partner system 410 includes a second execution layer control panel 412, but the second execution layer is provided as a second execution layer 434 by the service provider system 430. Similarly, the second partner system 420 may provide a second execution layer control panel 422, but a corresponding second execution layer 436 may be provided by the service provider system 430.

The system 400 demonstrates additional aspects for distributing execution layers that provide split control of a computing environment, and also demonstrates aspects of the present disclosure for providing additional secondary execution layers dedicated to one or more additional entities. For example, as shown in FIG. 4, the first partner system 410 includes the second execution layer control panel 412 and the second partner system 420 includes the second execution layer control panel 422. Each of the respective partner entities may maintain control over the presentation of the computing environment used to provide the service via their respective control panels. At the service provider system 430, a single first execution layer 432 is illustrated and provides underlying functionality for providing a service to users of both the first partner system 410 and the second partner system 420. In an aspect, the second execution layer 434 may facilitate presentation of the computing environment to the first partner system 410 or another device associated with the first partner (e.g., a device located at the partner location 414) in accordance with a computing environment configuration generated using the second execution layer control panel 412, and the second execution layer 436 may facilitate presentation of the computing environment to the second partner system 420 or another device associated with the second partner (e.g., a device located at the second partner location 424) in accordance with a computing environment configuration generated using the second execution layer control panel 422. As described above with reference to FIGS. 1-3, aspects of the present disclosure may enable the service to be provided entirely by the partner, such as only at partner location 414 and/or other locations of the first partnering entity, or may be provided via a combination of partner locations and service provider locations, such as at the second partner location 424 and service provider location 438.

Figure 5:
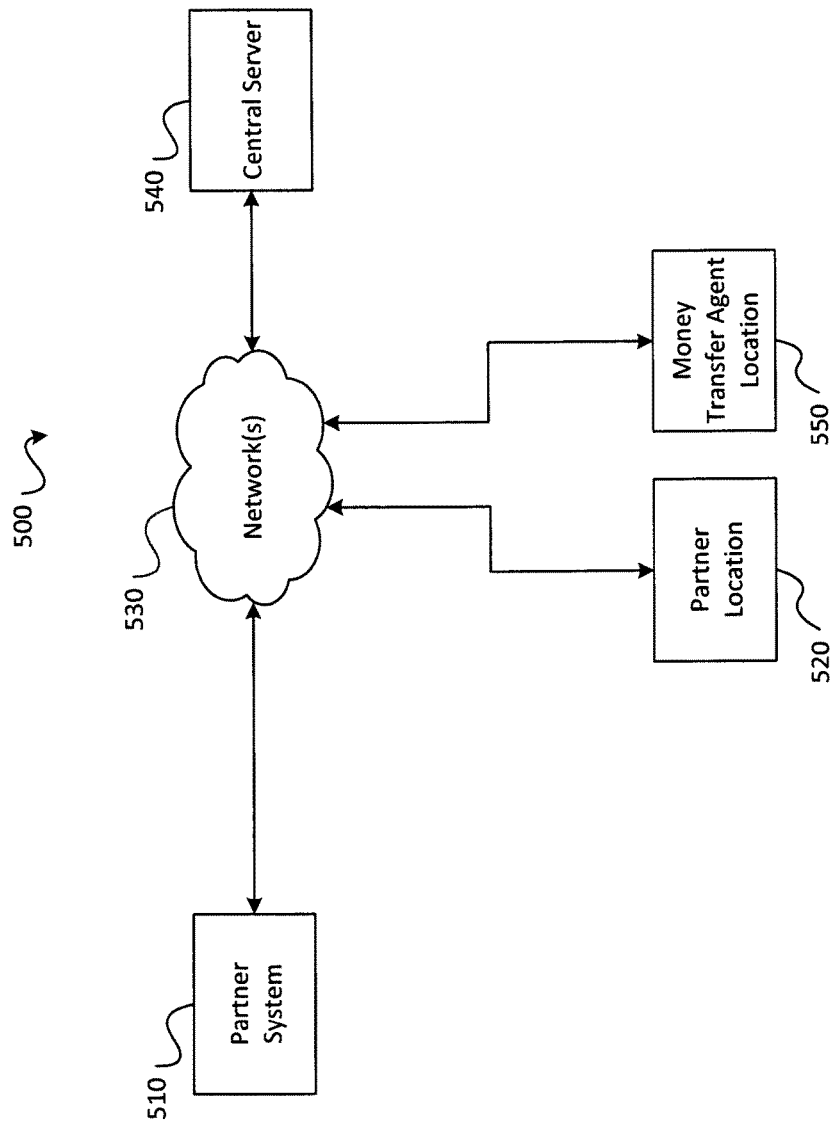
FIG. 5 is a block diagram illustrating aspects of a system for providing split control of an execution environment for providing money transfer services.

Referring to FIG. 5, a block diagram illustrating aspects of a system for providing split control of an execution environment for providing money transfer services is shown as a system 500. As shown in FIG. 4, the system 500 includes a partner system 510, a partner location 520, a network(s) 530, a central server 540, and a money transfer agent location 550. The central server 540 may be a server operated by a money transfer entity that provides money transfer services.

The network(s) 530 may include a local area network (LAN), a wireless LAN (WLAN), a wide area network (WAN), a wireless WAN (WWAN), a public network (e.g., the Internet), a private network, a cellular data network, another type of network, or a combination thereof. The network 530 may operate according to one or more communication protocols, such as a transport control protocol/Internet protocol (TCP/IP), an Ethernet protocol, a cellular communication protocol (e.g., a $3^{rd}$ Generation (3G) wireless communication protocol, a $4^{th}$ Generation (4G)/long term evolution (LTE) wireless communication protocol, etc.), another wired or wireless communication protocol, or a combination thereof. In an aspect, the network 530 may include multiple networks operated by different entities, such as a first network operated by a first entity (e.g., the partner) and a second network operated by a second entity (e.g., the money transfer service provider).

In an aspect, the partner system 510 may be located at the partner location 420. In an aspect, the partner system 510 may be a point of sale (POS), an automated teller machine (ATM), a workstation, a mobile device, a tablet computing device, a personal computing device, a laptop computing device, or a combination thereof, located at the partner location 520. In an additional or alternative aspect, the partner system 510 may be a server operated as part of a private network of the partner, where the private network provides interconnectivity and functionality to various systems located at partner locations, such POSs or workstations located at the partner location 520.

In an aspect of the system 500, the central server 540 may be configured to provide a first execution layer (e.g., the first execution layer 130 of FIG. 1), a second execution layer (e.g., the second execution layer 132 of FIG. 1), and a second execution layer control panel (e.g., the second execution layer control panel 134 of FIG. 1). In this aspect, the partner system 510, or another partner device, may be provided with web-based access (e.g., via the network(s) 530) to the second execution layer control panel to configure presentation related aspects of a computing environment (e.g., the computing environment 200 of FIG. 2) that is to be presented to a user of a partner device located at the partner location 520 to provide money transfer services. The computing environment may provide the user of the partner device with access to one or more money transfer services provided by the money transfer service provider. In an aspect, the configuration of the computing environment may be such that the computing environment used to provide money transfer services is configured or branded to appear as though the partner is the money transfer service provider. This allows the partner to accrue "good will" from customers that utilize the money transfer services through the partner. Additionally, because the money transfer service provider is handling execution of the service (e.g., via the first execution layer), the partner can rely on the money transfer service provider's expertise in performing regulatory compliance checks related to fraud prevention, risk mitigation, regulatory compliance operations and auditing, and the like. Further, by partnering with the money transfer service provider, attempts to circumvent such regulations may be mitigated. For example, regulations may restrict the amount of money that a person may send in a single money transfer, the total amount of money that a person may send during a time period, or other types of limitations or restrictions. Because the money transfer service provider is involved in the provisioning of the money transfer services through the partner, the money transfer service provider can more easily detect whether an individual satisfies these restrictions. For example, if an individual performed money transfers with the money transfer service provider until at least one regulation restricted the individual from conducting additional money transfer transactions, and then attempted to use the money transfer services provided by the partner to circumvent the restrictions, such activity may be detected by the money transfer service provided by the first execution layer, thereby preventing the individual from circumventing the regulations.

In addition to the computing environment of the system 500 providing the partner with capabilities to offer branded money transfer services, the computing environment may allow additional information (e.g., the additional information 224 of FIG. 2) to be presented to the user. For example, in addition to facilitating operations to provide the money transfer service, the computing environment may be configured to provide, as the additional information, coupons or other promotional offers, multimedia content (e.g., video content, audio content, image content etc.) or other information related to products and/or services that the partner may offer. In an aspect, the additional information may be determined by a secondary service provided by the second execution layer. For example, if the computing environment is presented at a POS, the secondary service may facilitate ringing up of items that may be purchased by the consumer at the time the consumer requests the money transfer transaction. As another example, if the computing environment is presented at a kiosk, the secondary service may be a movie rental service (e.g., a streaming and/or disk-based rental service), and the user may rent a movie in addition to executing a money transfer transaction. Additional examples of products and services that may be provided as either primary services or secondary services by the first and second execution layers include: music purchases, ringtone purchases, bill-pay services, prepaid card purchases, loading funds onto prepaid card, purchasing cellular minutes on a prepaid cellular phone, and the like.

In an aspect, various security measures may be implemented by the system 500 to provide data and transaction security/integrity. For example, prior to communicating information (e.g., the service information and/or additional service information) input into the computing environment to the central server 540 for processing by the first execution layer, the information may be encrypted. In an aspect, the encryption may be performed according to an encryption standard specified by the money transfer service provider, which may be determined from information stored in a database, such as the database 124 of FIG. 1). Additionally, a secure connection may be established between the device presenting the computing environment and the central server 540. In an aspect, at least a portion of the information may be provided to the computing environment automatically.

For example, if the user requesting the money transfer service has an account with the money transfer service provider, the user may provide login credentials or other information (e.g., biometric information) to the computing environment, and that information may be used to retrieve a profile of the user from the central server 540. Information from the user's profile may then be extracted and used to automatically populate portions of the service information and/or additional service information requested by the computing environment. In an aspect, the login credentials may be associated with a profile or account that the user has with the partner, rather than an account with the money transfer service provider.

In an aspect, the money transfer service provider may place restrictions on the first execution layer that limit the services provided, depending on the arrangement between the money transfer service provider and the partner. For example, in an aspect, the first execution layer may restrict funding of money transfers made using the computing environment provided by the system 500 to money transfer agent locations, such as the money transfer agent location 550. Thus, money transfer transactions made using the computing environment provided by the system 500 may require that the receiving party visit a money transfer agent location in order to receive funds in connection with the money transfer. This may allow the partner to provide money transfer services to its customers without requiring that the partner keep quantities of cash on hand for use in funding money transfers, which may be undesirable for some partners. In an additional or alternative aspect, the first execution layer may permit funding of money transfers made at partner locations, such as the partner location 520, or at money transfer agent locations, such as the money transfer agent location 550. This may provide a more robust network of locations where money transfer transactions may be funded (e.g., because the partner may operate in locations where there are few, or no money transfer agent locations, and the money transfer service provider may operate money transfer agent locations in areas where the partner does not operate locations), which may allow the service to more easily be provided to potentially under-served areas. In still other additional or alternative aspects, the first execution layer may restrict funding of money transfers to partner locations, such as the partner location 520. This may increase the appearance that the money transfer service is provided in its entirety by the partner, which may in turn increase the "good will" that the partner receives.

During operation, a user may visit the partner location 520 and may interact with an employee or device at the partner location 520 to perform a money transfer transaction. When the user interacts with a device at the partner location 520 to perform the money transfer transaction, the device may be a kiosk device or other self-service device that has been provided by the partner and configured to access and/or execute the second execution layer to present the computing environment. When the user interacts with the employee at the partner location 520, the employee may interact with a POS or other electronic device of the partner location 520 that is configured to access and/or execute the second execution layer to present the computing environment. One or more input/output devices may be used to provide inputs to the computing environment to provide the service information and additional service information, if any. Once all inputs have been provided, the service information may be provided to the first execution layer, which then performs various operations and functionality for providing the money transfer service. For example, the first execution layer may verify that the user and/or the receiving party are not identified in a list of persons prohibited from engaging in money transfer transaction, that the location where the money transfer transaction is to be funded is valid (e.g., money transfer transactions to certain countries are prohibited by government regulations), that the money transfer transaction has been properly funded (e.g., no fraud or money laundering is detected), or other operations to validate the integrity and propriety of the money transfer transaction.

If the transaction validation and integrity operations succeed and the money transfer transaction is authorized to be completed, the money transfer transaction may be initiated, and a receipt may be provided to the user. In an aspect, the receipt may include a code that may be provided to the receiving party for use in obtaining funding of the money transfer transaction. In an additional or alternative aspect, a notification (e.g., an e-mail, a text message, a multimedia message, an automated voice response message, and the like) may be generated and sent to the receiving party, where the notification includes information that enables the receiving party to receive funds in connection with the money transfer transaction. In still other additional or alternative aspects, the money transfer transaction may be funded automatically by depositing (e.g., using an electronic funds transfer (EFT)) the funds into an account (e.g., a bank account, a prepaid card account, etc.) of the receiving party. In an aspect, the first execution layer may provide different informational requirement depending on the type of money transfer transaction (e.g., cash-to-cash, cash-to-account, credit-to-cash, etc.), and the second execution layer control panel may be used to configured different presentation formats for different money transfer transaction types. In an aspect, the second execution layer may further present one or more questions at the computing environment to determine the type of money transfer transaction (or another type of service) being requested, and then may select the appropriate computing environment configuration based on the determined type.

In an aspect, the inputs provided to the computing environment may be provided to the first execution layer as they are received. For example, as the user provides information to the information fields of the service inputs, that information may be securely provided to the first execution layer, which may then begin one or more validation and transaction execution processes. This may include receiving inputs representative of the sending party's name, which may then be provided to the first execution layer to validate that the sending party is authorized to engage in the money transfer transaction. While the sending party's name information is being validated, inputs representative of the amount of the requested money transfer transaction may be received and provided to the first execution layer. If the sending party is authorized to engage in a money transfer transaction, the amount may then be analyzed to determine whether it satisfies one or more regulatory restrictions. If, at any point during the provisioning of the service by the first execution layer, an error occurs, such as if the sending or receiving party is determined to not be authorized to engage in the requested money transfer transaction, or if the amount of the requested money transfer exceeds a regulatory limit, the first execution layer may provide an error message to the second execution layer, which may cause the second execution layer to present information representative of the error to the user via the computing environment. Thus, the various execution layers of the system 500 may facilitate bi-directional communication during processing of requested service, which may streamline the process of providing the service to the requesting user. In some aspects, the second execution layer may present other information for resolving the error, such as a telephone number of the service provider that may be called to seek clarification as to the cause of the error, or to resolve the error (e.g., if the user was incorrectly identified as not authorized to participate in the requested money transfer transaction). In an aspect, the telephone number may be configured such that the customer service representative of the money transfer service provider is aware that the user was requesting the service through the partner, and may provide customer service to the user as if the customer service representative was an agent of the partner, rather than a representative of the money transfer service provider. This may further reinforce that the partner is acting as the service provider, which may further increase the "good will" accrued to the partner by users of the system 500.

In an aspect, the partner may offer promotions that provide the service at a discounted rate. For example, if the partner is a chain of convenience stores, the partner may offer a free money transfer transaction for every $100 spent at partner locations. This may provide an incentive for the users to utilize the service through the partner, rather than another existing entity that provides the service. In an aspect, the partner may pay the service provider a fee every time the service is provided to one of the partner's users. In an additional or alternative aspect, the partner may pay a fee (e.g., monthly fee, a quarterly fee, a yearly fee, etc.) to the service provider in exchange for facilitating the execution of the service (e.g., in exchange for the service provider providing the partner with access to the first execution layer).

Figure 6:
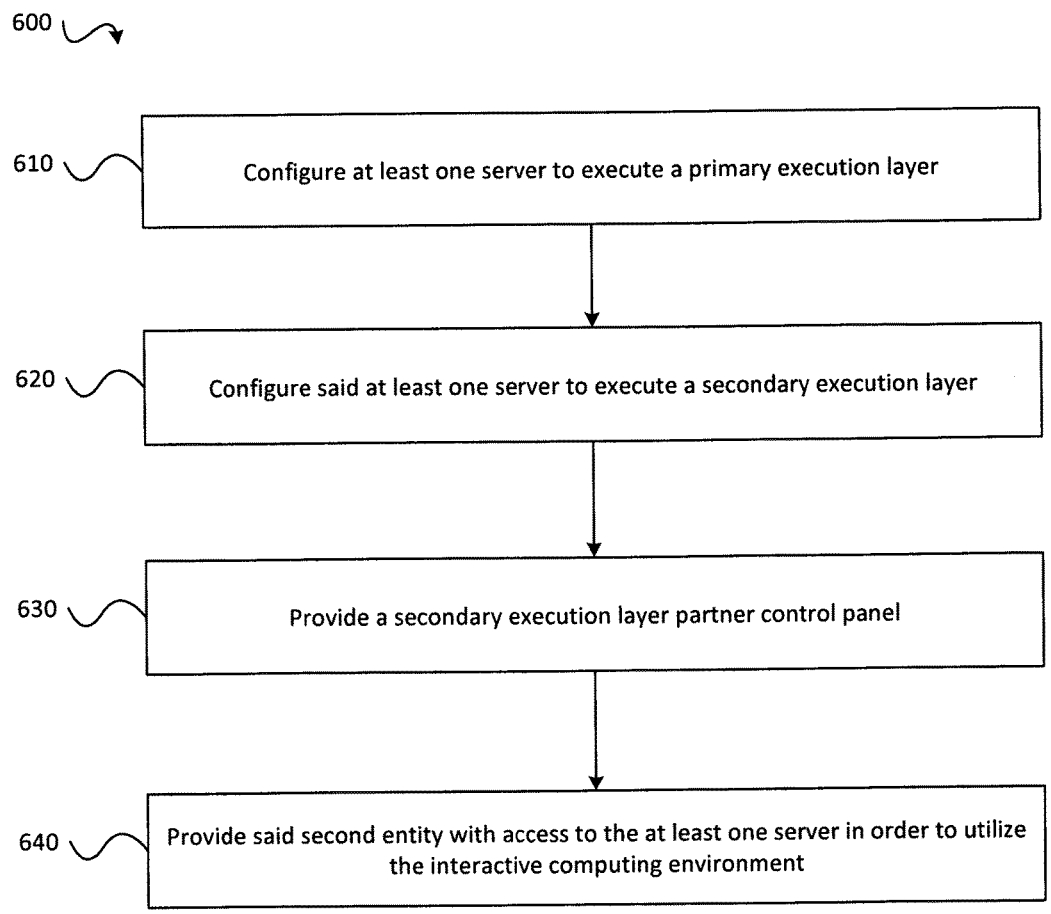
FIG. 6 is a flow diagram of a method for providing split control of a computing environment according to aspects of the present disclosure.

Referring to FIG. 6, a flow diagram of a method for providing split control of a computing environment according to aspects of the present disclosure is shown as a method 600. In an aspect, the method 600 may be stored as instructions (e.g., the instructions 122 of FIG. 1) that, when executed by one or more processors (e.g., the one or more processors 112 of FIG. 1), cause the one or more processors to perform operations for providing split control of a computing environment during provisioning of a service to an end user. In an aspect, the method 600 may be performed by one or more of the systems described above with respect to FIGS. 1 and 3-5 to enable a partner to provide a service.

At 610, the method 600 includes configuring at least one server to execute a first execution layer. As described with reference to FIGS. 1-5 above, the first execution layer may correspond to a service that is implemented by a first entity. In an aspect, the first entity may be a service provider, such as a money transfer service provider, a streaming media service provider, or another type of service provider. At 620, the method 600 includes configuring the at least one server to execute a second execution layer. In an aspect, the second execution layer may include a presentation layer that governs the presentation of a computing environment (e.g., the computing environment 200 of FIG. 2) while taking into account execution requirements of the first execution layer. At 630, the method 600 includes providing a second execution layer control panel. In an aspect, the second execution layer control panel may provide control functionality to a second entity over one or more configuration aspects of the secondary execution layer, as described above with reference to FIGS. 1-5.

At 640, the method 600 may include providing the second entity with access to the at least one server in order to utilize the interactive computing environment. As described with reference to FIGS. 1-5, the various execution layers and the control panel may provide an interactive computing environment that enables the second entity to provide the service of the first entity to an end user while also controlling the secondary execution layer, which controls presentation related aspects (e.g., the look and feel) of the computing environment used to provide the service, as described above with reference to FIGS. 1-5. It is noted that the method 600 may include providing additional instances of the second execution layer, such as to enable additional partnering entities to provide the service, and may also provide additional instances of the second execution layer control panel to enable each of those additional partnering entities to customize the look and feel of a computing environment for providing the service. Additionally, in an aspect, the method 600 may include providing additional first execution layers corresponding to additional services, and computing environments for providing those additional services may be customized using the second execution layer control panel according to aspects of the present disclosure.

Aspects of the method 600 provide techniques for implementing split control of an execution environment configured to provide one or more services. The second execution layer and second execution layer control panel provide a partnering entity to exert creative control and freedom over the computing environment utilized to provide the service(s), while the first execution layer allows a service provider to maintain control over underlying functionality for providing the service. Such techniques allow for rapid deployment of services to new audiences and marketplaces, while reducing costs and delays for all parties involved. For example, the service provider does not have to invest in infrastructure, such as new service provider locations, systems, networks, and employees to provide the service, and the partner does not have to invest in the development of the infrastructure necessary to provide the service.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing a computing environment that executes services from a plurality of entities, said method comprising:

receiving, by a processor, a request to access a primary service controlled by a first entity, wherein the request is received via a network from an electronic device of a second entity that is different from the first entity;

in response to receiving the request, executing, by the processor, a secondary execution layer to present a graphical user interface at the electronic device of the second entity based on presentation information received from the second entity via a secondary execution layer partner control panel and execution requirements of the primary service specified by the first entity, wherein the graphical user interface includes a plurality of data fields configured to receive information associated with at least the execution requirements of the primary service; and executing, by the processor, a primary execution layer to provide the primary service to the second entity based on inputs to the plurality of data fields, wherein the primary execution layer is controlled by the first entity, and wherein executing the primary execution layer to provide the primary service comprises:

executing a set of rules against inputs to the plurality of data fields to verify providing the primary service complies with one or more regulatory requirements, wherein the set of rules is adapted for asynchronous execution with respect to the inputs to the plurality of data fields such that the set of rules is executable against inputs to a first portion of the plurality of data fields prior to receiving inputs to all data fields of the plurality of data fields; and in response to verifying, based on the execution of the set of rules against the inputs to the plurality of data fields, that providing the primary service complies with the one or more regulatory requirements, initiating operations to provide the primary service to the second entity.

2. The method of claim 1 further comprising executing the secondary execution layer to provide a secondary service to the second entity.

3. The method of claim 2 wherein the secondary service includes one or more of providing coupon offers, providing video content, providing audio content, providing bill pay services, prepaid card service, prepaid cellular services, or a combination thereof.

4. The method of claim 1 further comprising presenting a second graphical user interface to the second entity via a web page, wherein the second graphical user interface provides the second entity with access to the secondary execution layer partner control panel.

5. The method of claim 1 wherein the primary execution layer and the secondary execution layer are hosted on a server of the first entity.

6. The method of claim 1 wherein the primary execution layer is hosted on a server of the first entity and the secondary execution layer is hosted on a server of the second entity.

7. The method of claim 1 further comprising executing, by the processor, additional secondary execution layers dedicated to one or more additional entities that are different from the first entity and the second entity, wherein each of the additional secondary execution layers provides a corresponding one of the additional entities with access to the primary service of the first entity.

8. The method of claim 1 wherein the execution requirements of the primary service comprise one or more required data fields.

9. The method of claim 1 wherein the presentation information comprises information that specifies a layout of the plurality of data fields within the graphical user interface, a font, a font color, a font size, one or more data field input mechanisms, or a combination thereof.

10. The method of claim 1 wherein the electronic device of the second entity is a point-of-sale device, a mobile device, a tablet computing device, a personal computing device, a laptop computing device, or an automated teller machine.

11. A system for providing a computing environment that executes services from a plurality of entities, said system comprising:
   at least one server comprising:
      one or more processors; and
      a memory communicatively coupled to the one or more processors,
   wherein the one or more processors are configured to:
      receive a request to access a primary service controlled by a first entity, wherein the request is received via a network from an electronic device of a second entity that is different from the first entity;
      in response to receiving the request, execute a secondary execution layer to present a graphical user interface at the electronic device of the second entity based on presentation information received from the second entity via a secondary execution layer partner control panel and execution requirements of the primary service specified by the first entity, wherein the graphical user interface includes a plurality of data fields configured to receive information corresponding to the execution requirements of the primary service; and
      execute a primary execution layer to provide the primary service to the second entity based on inputs to the plurality of data fields received via the graphical user interface, wherein the primary execution layer is controlled by the first entity, and wherein execution of the primary execution layer, by the one or more processors, to provide the primary service includes:
         executing a set of rules against inputs to the plurality of data fields to verify providing the primary service complies with one or more regulatory requirements, wherein the set of rules is adapted for asynchronous execution with respect to the inputs to the plurality of data fields such that the set of rules is executable against inputs to a first portion of the plurality of data fields prior to receiving inputs to all data fields of the plurality of data fields; and
         in response to verifying, based on the execution of the set of rules against the inputs to the plurality of data fields, that providing the primary service complies with the one or more regulatory requirements, initiating operations to provide the primary service to the second entity.

12. The system of claim 11 wherein the at least one processor is configured to execute the secondary execution layer to provide a secondary service to the second entity.

13. The system of claim 12 wherein the secondary service includes one or more of providing coupon offers, providing video content, providing audio content, providing bill pay services, prepaid card service, prepaid cellular services, or a combination thereof.

14. The system of claim 11 wherein the at least one processor is configured to present a second graphical user interface to the second entity via a web page, wherein the second graphical user interface provides the second entity with access to the secondary execution layer partner control.

15. The system of claim 11 wherein the primary execution layer and the secondary execution layer are hosted on a server of the first entity.

16. The system of claim 11 wherein the at least one processor is configured to execute additional secondary execution layers dedicated to one or more additional entities that are different from the first entity and the second entity, wherein each of the additional secondary execution layers provides a corresponding one of the additional entities with access to the primary service of the first entity.

17. A non-transitory computer-readable storage medium storing instructions that, when executed by one or more processors, cause the one or more processors to perform operations for providing a computing environment that executes services from a plurality of entities, said operations comprising:
   receiving a request to access a primary service controlled by a first entity, wherein the request is received via a network from an electronic device of a second entity that is different from the first entity;
   in response to receiving the request, executing a secondary execution layer to present a graphical user interface at the electronic device of the second entity based on presentation information received from the second entity via a secondary execution layer partner control panel and execution requirements of the primary service specified by the first entity, wherein the graphical user interface includes a plurality of data fields configured to receive information corresponding to the execution requirements of the primary service; and
   executing a primary execution layer to provide the primary service to the second entity based on inputs to the plurality of data fields received via the graphical user interface, wherein the primary execution layer is controlled by the first entity, and wherein executing the primary execution layer to provide the primary service comprises:
      executing a set of rules against inputs to the plurality of data fields to verify providing the primary service complies with one or more regulatory requirements, wherein the set of rules is adapted for asynchronous execution with respect to the inputs to the plurality of data fields such that the set of rules is executable against inputs to a first portion of the plurality of data fields prior to receiving inputs to all data fields of the plurality of data fields; and
      in response to verifying, based on the execution of the set of rules against the inputs to the plurality of data fields, that providing the primary service complies with the one or more regulatory requirements, initiating operations to provide the primary service to the second entity.

18. The non-transitory computer-readable storage medium of claim 17 wherein the operations include presenting an error message in response to in response to verifying, based on the execution of the set of rules against the inputs to the plurality of data fields, that providing the primary service does not comply with the one or more regulatory requirements.

19. The non-transitory computer-readable storage medium of claim 17 wherein the request comprises information associated with a type of access to the primary service requested by the second entity, wherein the secondary execution layer is configured to present different graphical user interfaces at the electronic device of the second entity based on different types of requests to access for the primary service.

20. The non-transitory computer-readable storage medium of claim 17 wherein the primary execution layer is hosted on infrastructure of the first entity and the secondary execution layer and the secondary execution layer partner control panel are hosted on infrastructure of the second entity, the operations further comprising:

executing the secondary execution layer to provide a secondary service of the second entity via the infrastructure of the second entity.

* * * * *